(12) United States Patent
McCurry et al.

(10) Patent No.: US 11,027,392 B1
(45) Date of Patent: Jun. 8, 2021

(54) COMPACT MULTI-MATERIAL CUT-OFF TOOL

(71) Applicant: TECHTRONIC CORDLESS GP, Anderson, SC (US)

(72) Inventors: Ronald C. McCurry, West Union, SC (US); Adam Gathers, Anderson, SC (US); Kyle B. Yeomans, Easley, SC (US); Brian D. Mertel, Simpsonville, SC (US); M. Grayson Jacoway, Mauldin, SC (US); Brandon L. Hicks, Simpsonville, SC (US); Jesse J. Jerabek, Easley, SC (US); Nicholas S. Norton, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 16/858,973

(22) Filed: Apr. 27, 2020

(51) Int. Cl.
| | | |
|---|---|---|
| *F21V 33/00* | (2006.01) | |
| *B24B 23/02* | (2006.01) | |
| *B23D 45/16* | (2006.01) | |
| *B23D 47/12* | (2006.01) | |
| *F21Y 115/10* | (2016.01) | |

(52) U.S. Cl.
CPC .............. *B24B 23/02* (2013.01); *B23D 45/16* (2013.01); *B23D 47/12* (2013.01); *F21V 33/0084* (2013.01); *F21Y 2115/10* (2016.08)

(58) Field of Classification Search
CPC ...... B24B 23/02; B23D 45/16; B23D 45/165; B23D 47/12; B23D 47/123; F21V 33/0084
See application file for complete search history.

(56) References Cited

U.S. PATENT DOCUMENTS

| | | |
|---|---|---|
| 6,443,675 B1 | 9/2002 | Kopras et al. |
| 6,890,135 B2 | 5/2005 | Kopras et al. |
| 6,981,779 B2 | 1/2006 | Fukuoka |
| 7,094,011 B2 | 8/2006 | Kopras et al. |
| 7,918,030 B2 | 4/2011 | Fukuoka |
| 8,186,067 B2 | 5/2012 | Onose et al. |

(Continued)

FOREIGN PATENT DOCUMENTS

| | | |
|---|---|---|
| CN | 202029117 U1 | 11/2011 |
| CN | 104737835 A | 7/2015 |
| CN | 207900362 U1 | 9/2018 |

(Continued)

*Primary Examiner* — Sean P Gramling
(74) *Attorney, Agent, or Firm* — Michael Best & Friedrich LLP

(57) ABSTRACT

A compact multi-material cut-off tool includes a housing, and an arbor rotatably supported by the housing upon which a cutting disk is attachable for co-rotation therewith. A motor is coupled to the arbor to provide torque thereto. A controller is operable to selectively drive the motor in a first rotational direction and an opposite, second rotational direction. A first lighting element is coupled to a first portion of the housing, and a second lighting element is coupled to a second portion of the housing. One of the first lighting element and the second lighting element is configured to be activated by the controller in response to the motor being driven in the first rotational direction. The other of the first lighting element and the second lighting element is configured to be activated by the controller in response to the motor being driven in the second rotational direction.

19 Claims, 6 Drawing Sheets

(56) References Cited

U.S. PATENT DOCUMENTS 8,667,877 B2  3/2014  Marinov et al.
2007/0107235 A1* 5/2007  Mok .................... B23D 59/003
                                                30/264

FOREIGN PATENT DOCUMENTS

DE         8912224 U1   12/1990
DE   102011081025 A1    2/2013

* cited by examiner

COMPACT MULTI-MATERIAL CUT-OFF TOOL

FIELD OF THE DISCLOSURE

The present disclosure relates to power tools, and more specifically to cut-off tools.

BACKGROUND OF THE DISCLOSURE

Cut-off tools, such as multi-material cut-off tools, typically include a blade guard at least partially surrounding a cutting disk of the cut-off tool.

SUMMARY OF THE DISCLOSURE

The present disclosure provides, in one aspect, a compact multi-material cut-off tool including a housing, and an arbor rotatably supported by the housing upon which a cutting disk is attachable for co-rotation therewith. A motor is coupled to the arbor to provide torque thereto. A controller is operable to selectively drive the motor in a first rotational direction and an opposite, second rotational direction for selectively rotating the arbor and the cutting disk in the first rotational direction or the second rotational direction, respectively. The cut-off tool further includes a first lighting element coupled to a first portion of the housing, and a second lighting element coupled to a second portion of the housing. One of the first lighting element and the second lighting element is configured to be activated by the controller in response to the motor being driven in the first rotational direction. The other of the first lighting element and the second lighting element is configured to be activated by the controller in response to the motor being driven in the second rotational direction.

The present disclosure provides, in another aspect, a cut-off tool including a housing having a motor housing portion and a handle portion extending therefrom. An arbor is rotatably supported by the housing. A cutting disk is attachable to the arbor for co-rotation therewith. A motor is positioned within the motor housing portion. The motor is coupled to the arbor to provide torque thereto. A first lighting element is positioned proximate an end of the handle portion that is opposite the motor housing portion. A second lighting element is positioned on the motor housing portion. The first lighting element is configured to illuminate a workpiece behind the cutting disk. The second lighting element is configured to illuminate the workpiece in front of the cutting disk.

Other features and aspects of the disclosure will become apparent by consideration of the following detailed description and accompanying drawings.

Figure 1:
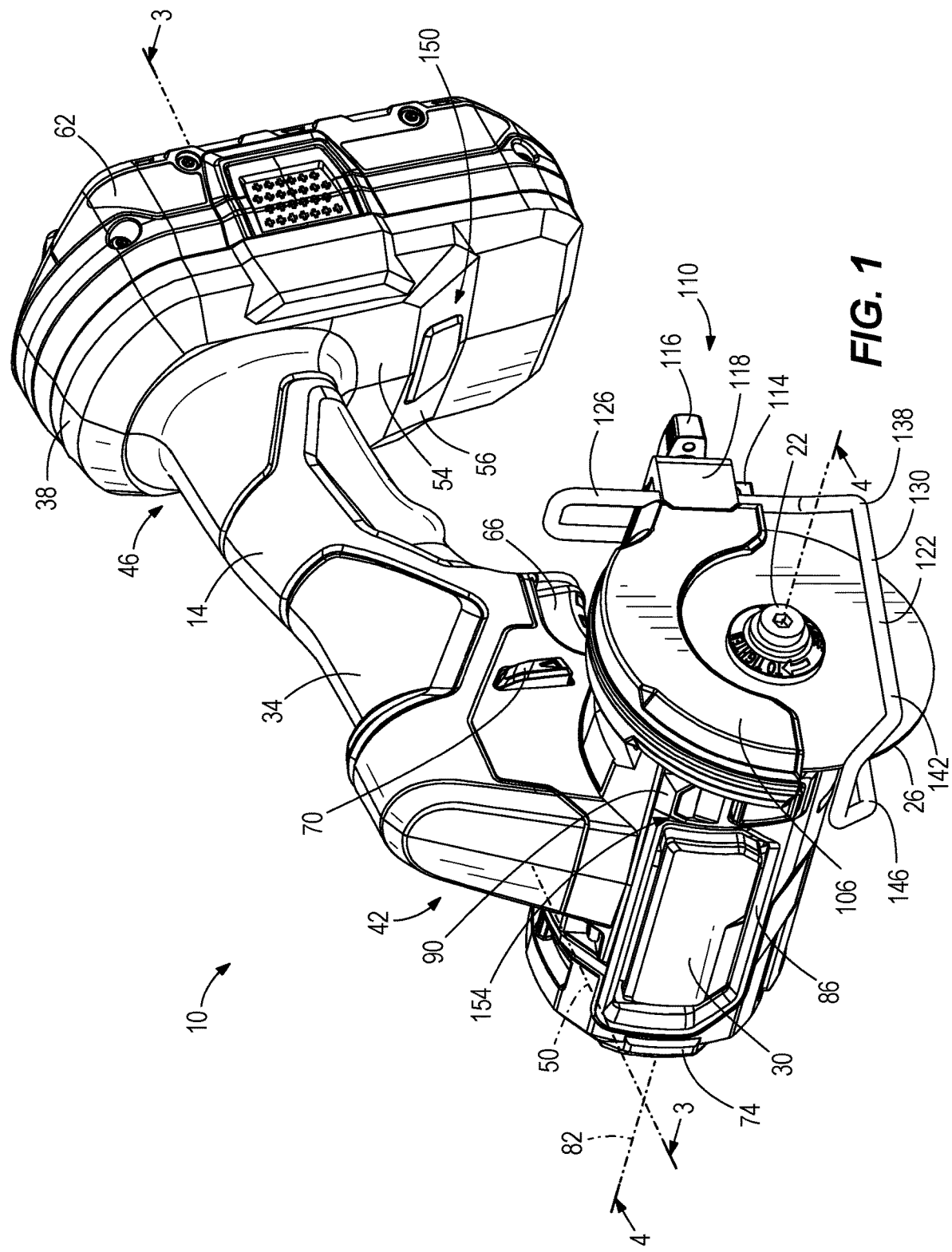
FIG. 1 is a perspective view of a cut-off tool in accordance with an embodiment of the disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-4 illustrate all or portions of a cut-off tool, such as a compact multi-material cut-off tool 10. The cut-off tool 10 includes a housing 14, a motor 18 (FIG. 4), and an arbor 22 driven by the motor 18 to which a small diameter (e.g., 3 inch) cutting or grinding disk (hereinafter, "cutting disk 26") is attachable. The motor 18 is rotatable in a first rotational direction (e.g., counter-clockwise from the frame of reference of FIG. 1) and an opposite, second rotational direction (e.g., clockwise from the frame of reference of FIG. 1) corresponding to a forward state and a reverse state, respectively, of the motor 18.

The housing 14 includes a motor housing portion 30. The motor 18 is positioned within the motor housing portion 30. The housing 14 further includes a handle portion 34 extending transversely from the motor housing portion 30 and terminating in a battery receiving portion 38. In particular, the handle portion 34 extends between a first end 42 and a second end 46 opposite the first end 42. The handle portion 34 defines a longitudinal axis 50 (FIG. 2) extending through the first and second ends 42, 46.

The motor housing portion 30 is adjacent the first end 42, and the battery receiving portion 38 is adjacent the second end 46. The battery receiving portion 38 includes a multi-tier surface 54 facing toward the motor housing portion 30. The battery receiving portion 38 defines a receptacle 58 (FIG. 3) in which a battery pack 62 is received. The battery pack 62 is electrically connected to the motor 18 for selectively supplying power to the motor 18.

The cut-off tool 10 also includes a trigger 66 protruding from the handle portion 34 of the housing 14. The trigger 66 is positioned proximate the motor housing portion 30 at the first end 42. The trigger 66 is electrically connected to the motor 18. The trigger 66 is positioned to permit a user to grasp the handle portion 34 for maneuvering the cut-off tool 10 (without an auxiliary handle) while depressing the trigger 66 to activate the motor 18.

The cut-off tool 10 further includes a forward/reverse selector switch (e.g., shuttle 70) located proximate the first end 42 of the handle portion 34. More specifically, the forward/reverse selector shuttle 70 is located adjacent a front of the handle portion 34 and between the motor housing portion 30 and the trigger 66. The forward/reverse selector shuttle 70 is configured to determine the state of the motor 18. More specifically, the forward/reverse selector shuttle 70 is movable between a first position and a second position corresponding to the forward state and the reverse state of the motor 18, respectively. The illustrated forward/reverse selector shuttle 70 is movable in a direction perpendicular to the longitudinal axis 50 of the handle portion 34. The forward/reverse selector shuttle 70 is positioned to permit the user to select either a forward or reverse rotational direction of the motor with their thumb, for example, while maintaining their grasp on the handle portion 34 with their index finger on the trigger 66.

Figure 2:
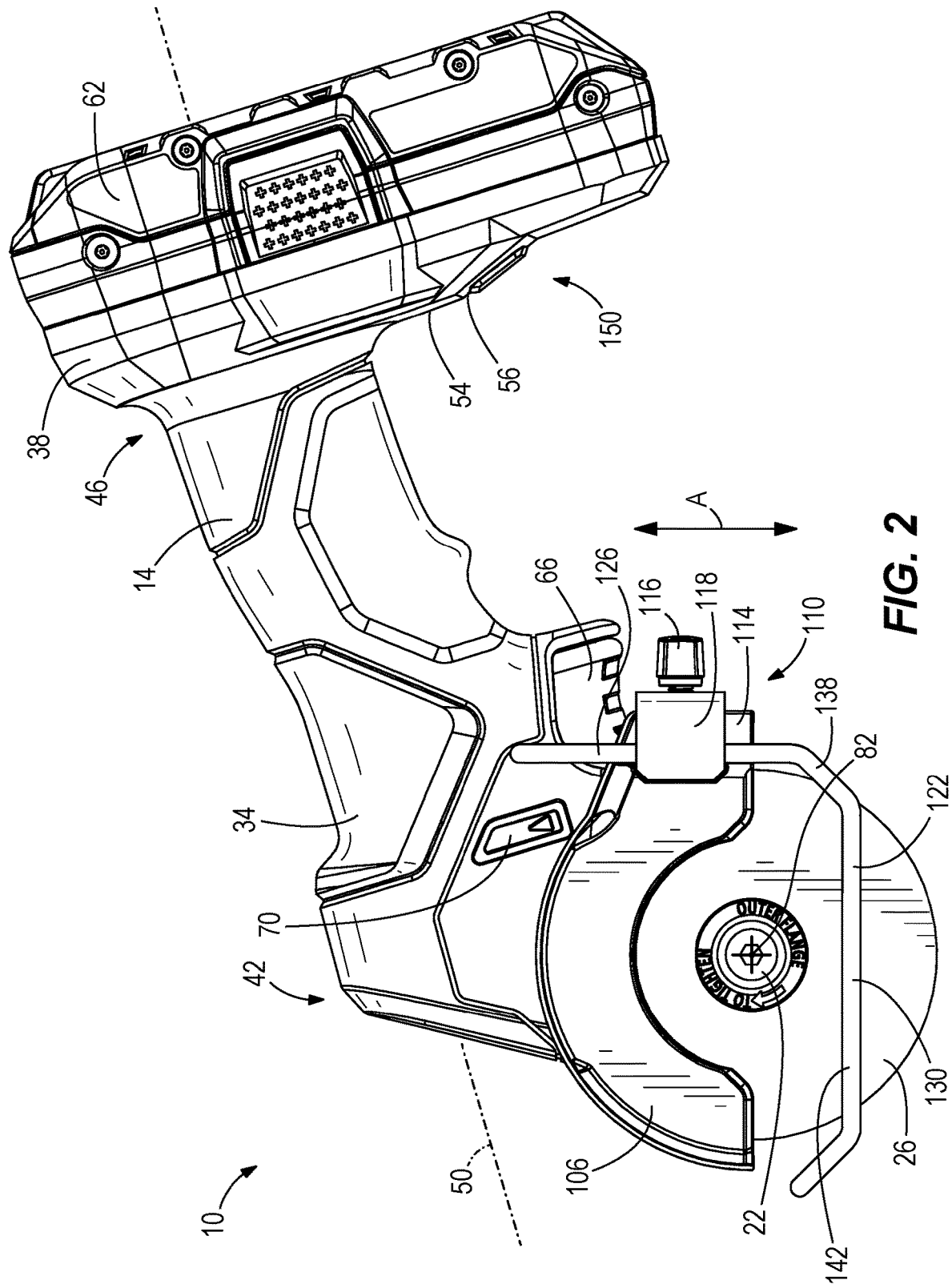
FIG. 2 is a side view of the cut-off tool of FIG. 1.
Figure 3:
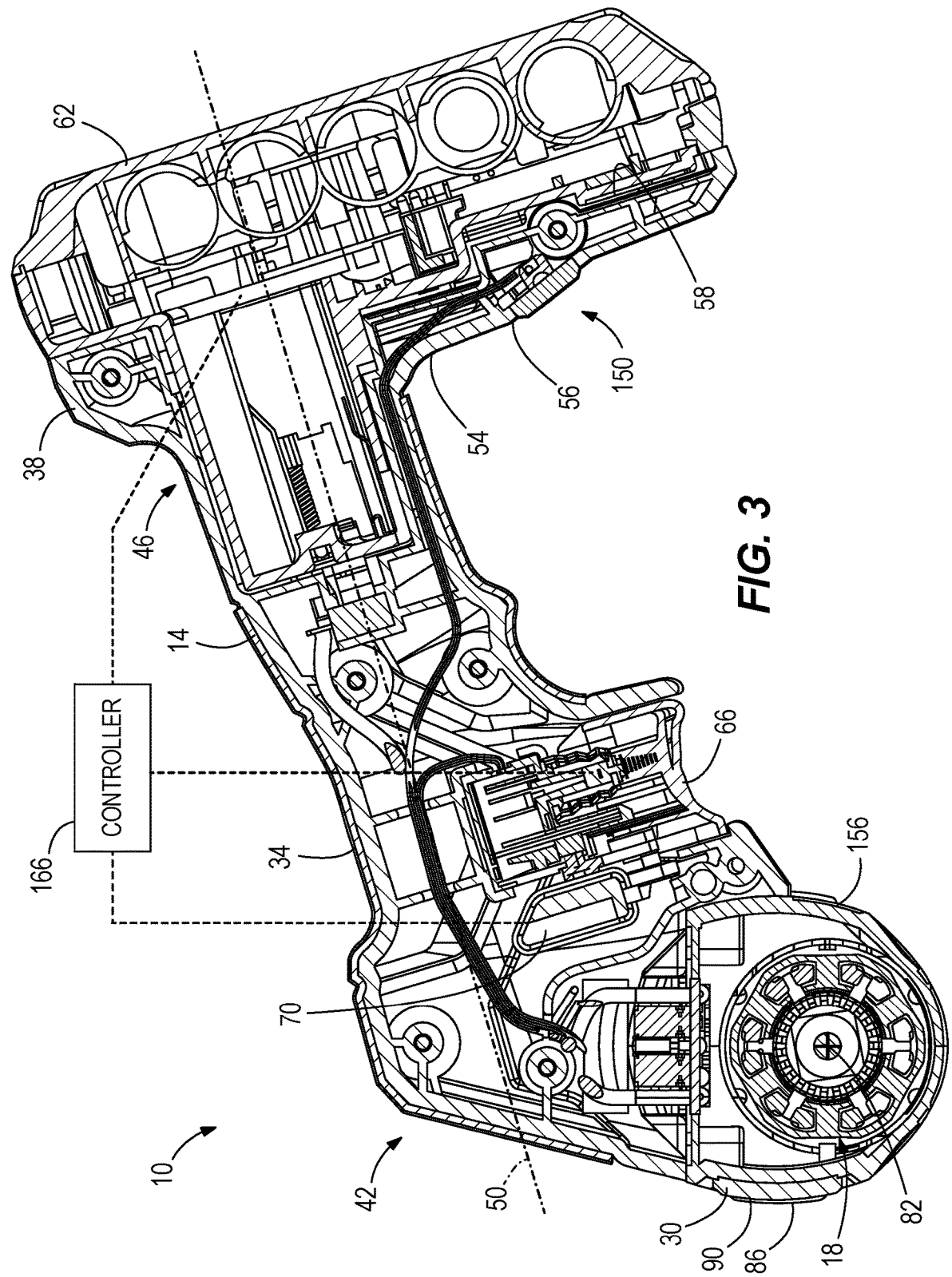
FIG. 3 is a cross-sectional view of the cut-off tool of FIG. 1 taken along section 3-3 in FIG. 1.
Figure 4:
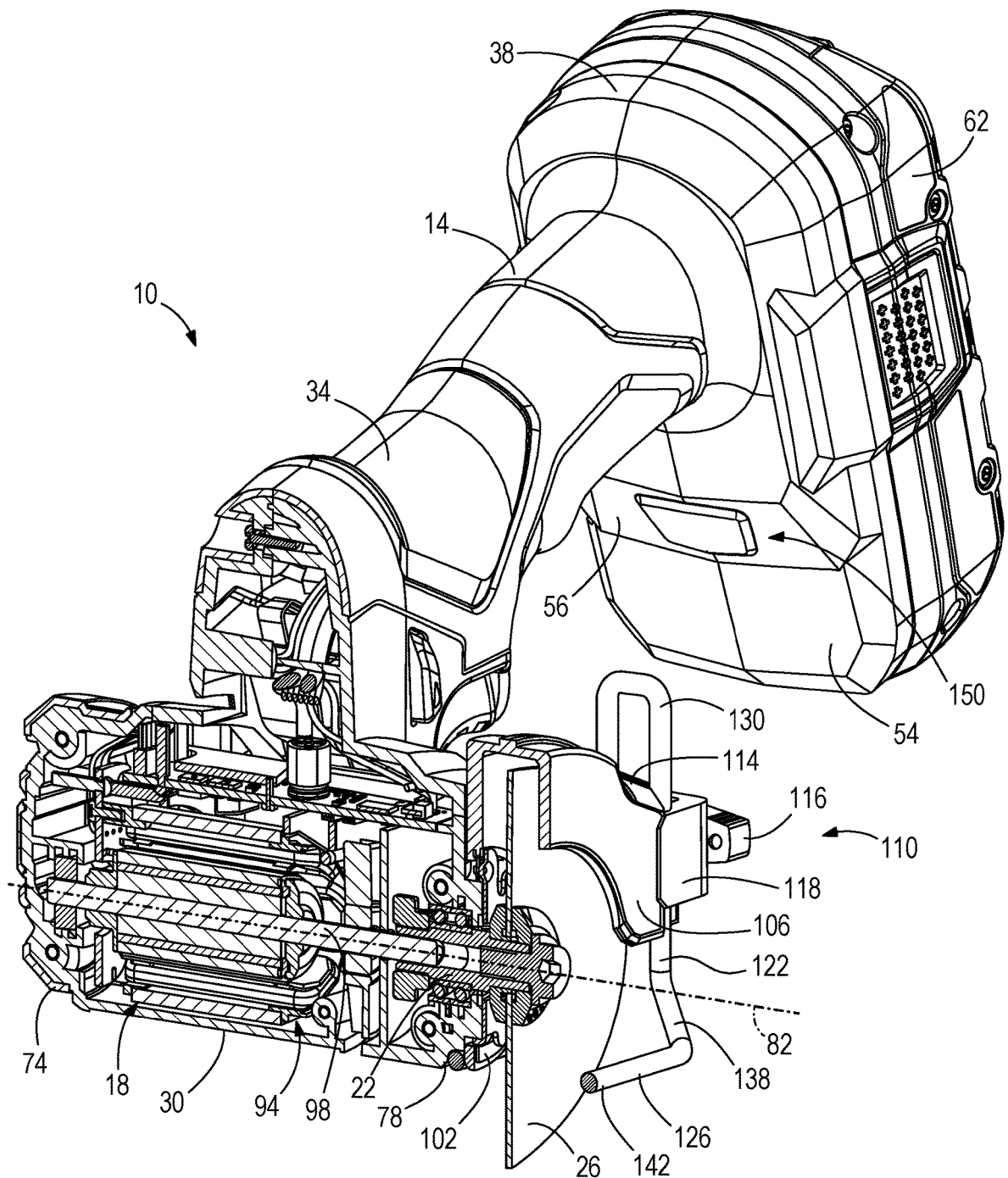
FIG. 4 is a cross-sectional view of the cut-off tool of FIG. 1 taken along section 4-4 in FIG. 1.

With reference to FIGS. 1-4, the motor housing portion 30 includes a first end 74 and a second end 78 opposite the first end 74. A rotational axis 82 of the motor 18 extends through the first end 74 and the second end 78 (FIG. 4). The rotational axis 82 is below the longitudinal axis 50 of the handle portion 34 (i.e., from the frame of reference of FIG. 3). The motor housing portion 30 further includes a generally cylindrical outer surface 86 extending between the first and second ends 74, 78. The outer surface 86 includes a first side 90 facing away from the battery receiving portion 38. In addition, the motor housing portion 30 defines a cavity 94 (FIG. 4) configured to receive the motor 18.

The motor 18 includes an output shaft 98 (FIG. 4) extending within the cavity 94 toward the second end 78 of the motor housing portion 30. The arbor 22 of the cut-off tool 10 is coupled for co-rotation with the output shaft 98. The arbor 22 extends along the rotational axis 82 from within the cavity 94 past the second end 78 of the motor housing portion 30 to external of the motor housing portion 30. The cutting disk 26 is removably attachable to an end of the arbor 22 that is external to the motor housing portion 30. In the illustrated embodiment, the cutting disk 26 is removably attachable by a retaining clip 102 (FIG. 4). The cutting disk 26 is positioned proximate the second end 78 of the motor housing portion 30.

With reference to FIGS. 1 and 2, the cut-off tool 10 includes an upper blade guard 106 supported on the motor housing portion 30. The upper blade guard 106 surrounds an upper portion of the cutting disc 26. The upper blade guard 106 includes an adjustment mechanism 110. The illustrated adjustment mechanism 110 includes a support member 114 positioned at one end of the upper blade guard 106, and an attachment member or bracket 118 removably coupled to the support member 114 by an adjustment knob 116.

The cut-off tool 10 further includes a shoe 122 movably coupled to the upper blade guard 106. The illustrated shoe 122 includes a first, vertical portion 126, and a second, horizontal portion 130. The first portion 126 is clamped between the bracket 118 and the support member 114 of the upper blade guard 106. A vertical position of the bracket 118 relative to the support member 114 is adjustable (e.g., by the adjustment knob 116) for adjustably coupling the shoe 122 to the upper blade guard 106. The second portion 130 is coupled to the first portion 126 by a plurality of bends 138. The second portion 130 includes a first leg 142 and a second leg 146 extending on either side of the cutting disc 26. Each leg 142, 146 is configured to contact a workpiece. The cutting disk 26 is configured to extend through a gap defined between the first and second legs 142, 146 when the cutting disk 26 is attached to the arbor 22. The shoe 122 is movable relative to the upper blade guard 106 in a vertical direction A (arrows; FIG. 2) that is perpendicular to the rotational axis 82 of the motor 18. More specifically, the shoe 122 is movable in the vertical direction A relative to the upper blade guard 106 to permit adjustment of a cutting depth of the cutting disc 26.

With continued reference to FIGS. 1-2, the tool 10 includes a plurality of lighting elements 150, 154 to illuminate a workpiece being cut by the tool 10. In the illustrated embodiment, the cut-off tool 10 includes a first lighting element 150 and a second lighting element 154. The illustrated first lighting element 150 is positioned on the battery receiving portion 38. More specifically, the first lighting element 150 is positioned on the multi-tier surface 54 of the battery receiving portion 38 facing a second side 156 of the motor housing portion 30 that is opposite the first side 90. The illustrated second lighting element 154 is positioned on the first side 90 of the motor housing portion 30 and proximate the cutting disk 26 (i.e., proximate the second end 78).

In some embodiments, each lighting element 150, 154 includes a light emitting diode (LED) supported by the housing 14, and a lens overlying the respective LED. In addition, in some embodiments, the lighting element 150, 154 is received in a respective receptacle defined by the housing 14. The lens may cover the receptacle.

Each lighting element 150, 154 is configured to project a light away from the cut-off tool 10 to illuminate an underlying workpiece during cutting. More specifically, the first lighting element 150 is positioned on the battery receiving portion 38 below the longitudinal axis 50 of the handle portion 34. In addition, the first lighting element 150 is oriented to face toward the second side 156 of the motor housing portion 30 such that the first lighting element 150 is oriented to face in a first direction (i.e., to the left from the frame of reference of FIG. 2). Further, the first lighting element 150 is positioned on an inclined portion 56 of the multi-tier surface 54. The inclined portion 56 is oriented at an oblique angle relative to the axis 50 such that the first lighting element 150 projects the light away from the surface 54 and downward toward the workpiece being cut by the tool 10. As such, the first lighting element 150 is positioned to illuminate the workpiece behind the cutting disk 26 (e.g., to the right of the cutting disk 26 from the frame of reference of FIG. 2).

The illustrated second lighting element 154 is positioned on the first side 90 of the motor housing portion 30 above the rotational axis 82 of the motor 18 (i.e., from the frame of reference of FIG. 1). In addition, the second lighting element 154 is oriented to face away from the motor housing portion 30 such that the second lighting element 154 is also oriented to face in the first direction (i.e., to the left from the frame of reference of FIG. 2). Further, similar to the first lighting element 150, the second lighting element 154 is oriented at an oblique angle relative to the axis 50 on the first side 90 such that the second lighting element 154 projects the light away from the motor housing portion 30 and downward toward the workpiece being cut by the tool 10. As such, the second lighting element 154 is positioned to illuminate the workpiece in front of the cutting disk 26 (e.g., to the left of the cutting disk 26 from the frame of reference of FIG. 2).

The cut-off tool 10 is configured to be moved (by a user) in both the forward direction (e.g., to the left from the frame of reference of FIG. 2) and the rearward direction (e.g., to the right from the frame of reference of FIG. 2) for cutting the underlying workpiece in both the forward and rearward directions. As such, the terms 'in front of' and 'behind' recited above when describing illumination of the workpiece relative to the cutting disk 26 are dependent upon the tool 10 moving in a forward direction during cutting. Alternatively, when the tool 10 is being moved to cut in a rearward direction by a user, the direction of light of the first and second lighting elements 150, 154 may be described as illuminating in front of the cutting disk 26 and behind the cutting disk 26, respectively. For example, when the tool 10 is being moved in a rearward direction by a user (e.g., to the right from the frame of reference of FIG. 2), the first lighting element 150 is positioned to illuminate the workpiece in front of the cutting disk 26, (e.g., to the right of the cutting disk 26 from the frame of reference of FIG. 2) and the second lighting element 154 is positioned to illuminate the workpiece behind the cutting disk 26 (e.g., to the left of the cutting disk 26 from the frame of reference of FIG. 2). In other words, the first and second lighting elements 150, 154 are positioned to project light on one side or the other, respectively, of the cutting disk 26, irrespective of the direction of movement of the cut-off tool 10.

Figure 5:
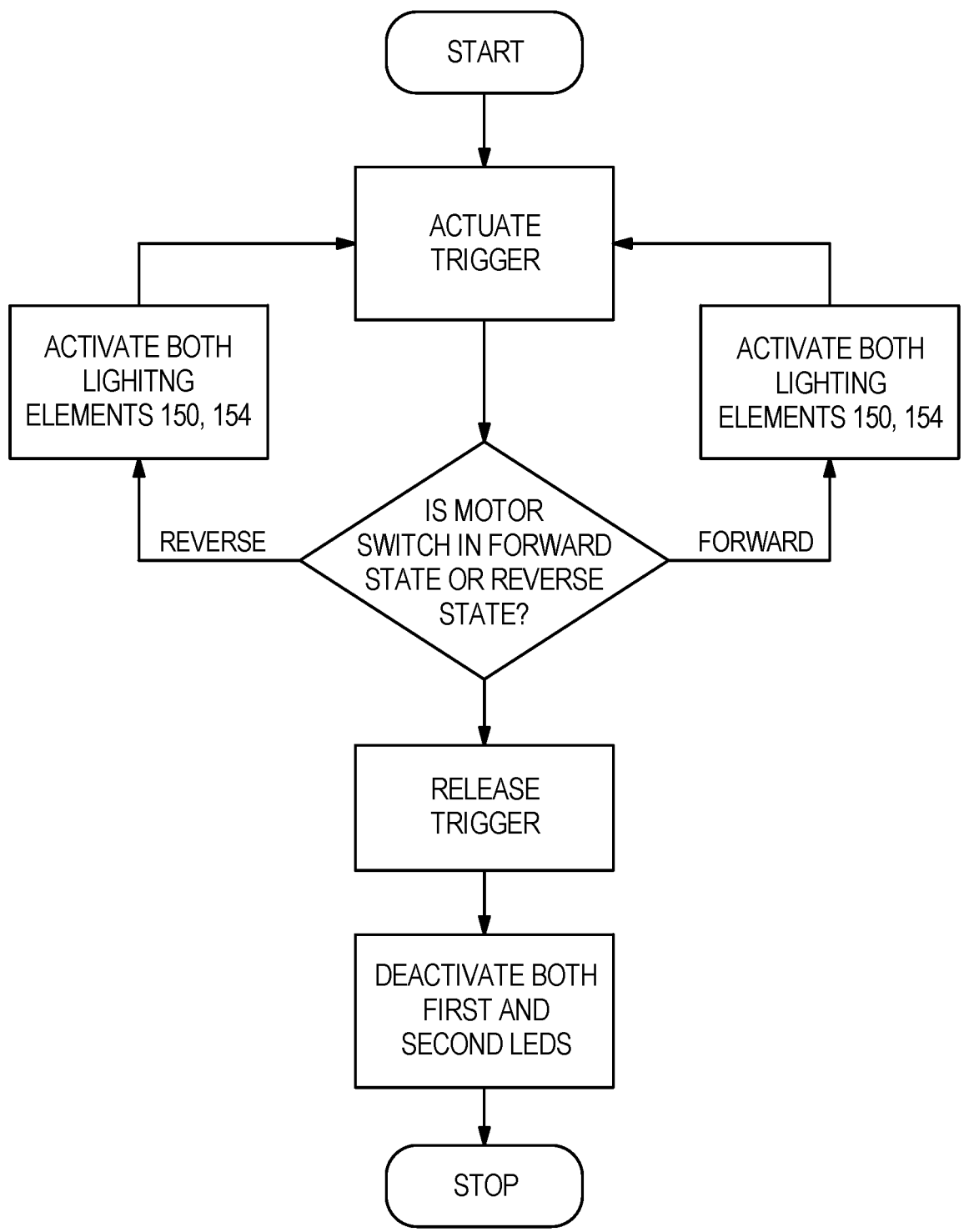
FIG. 5 is a flow chart illustrating a control process for activating lighting elements of the cut-off tool of FIG. 1.

The cut-off tool 10 further includes a controller 166 (FIG. 3). The controller 166 is electrically connected to the motor 18, the trigger 66, the forward/reverse selector shuttle 70, and the plurality of lighting elements 150, 154. The cut-off tool 10 may also include a sensor assembly (e.g., a Hall-effect sensor and magnet) electrically connected to the controller 166 for detecting actuation of the trigger 66 and/or detecting a position of the forward/reverse selector shuttle 70. The controller 166 is configured to determine actuation of the trigger 66 by a user to control operation of the motor 18. In one embodiment, as shown in FIG. 5, regardless of the position of the shuttle 70, both lighting elements 150, 154 are configured to activate (i.e., illuminate) simultaneously when the trigger 66 is actuated by a user. Accordingly, the workpiece is configured to be illuminated behind and in front of the cutting disk 26 during cutting, irrespective of the cutting direction of the tool 10 (forward or rearward).

Figure 6:
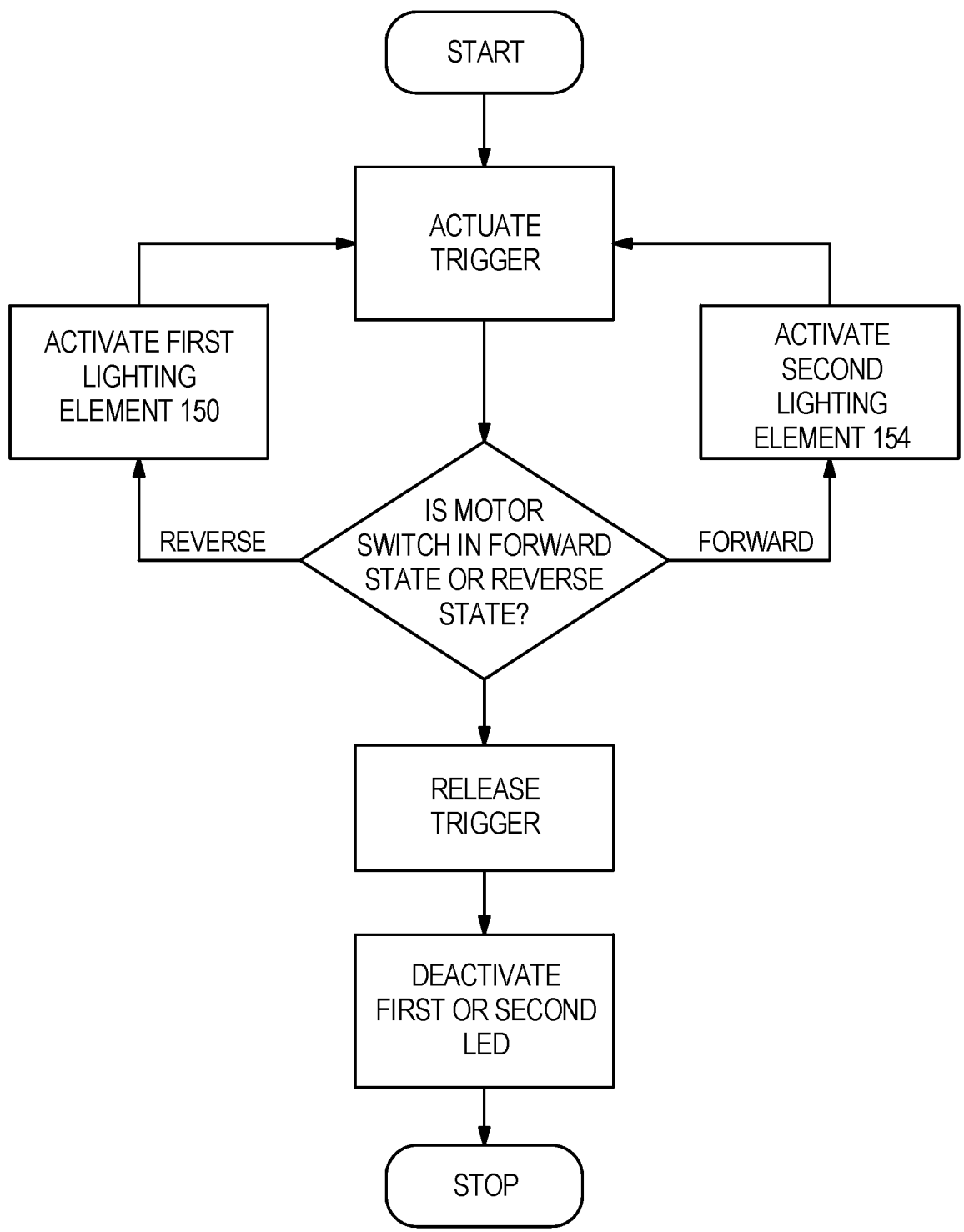
FIG. 6 is a flow chart illustrating another control process for activating lighting elements of the cut-off tool of FIG. 1 based on a rotational direction of a motor of the cut-off tool.

In other embodiments, select lighting elements 150, 154 are configured to activate based on a directional state of the motor 18. In this configuration, the controller 166 is configured to determine a position of the forward/reverse selector shuttle 70 for controlling activation of the select lighting elements 150, 154 based on the forward or reverse state of the motor 18. For example, as shown in FIG. 6, when the forward/reverse selector shuttle 70 is in the first position (corresponding to the forward state of the motor 18 to perform a cutting operation in the forward direction), only the second lighting element 154 is configured to activate to illuminate the workpiece in front of the cutting disk 26. And when the forward/reverse selector slide shuttle 166 is in the second position (corresponding to the reverse state of the motor 18 to perform a cutting operation in the rearward direction), only the first lighting element 150 is configured to activate to illuminate the workpiece behind the cutting disk 26.

Various features of the invention are set forth in the following claims.

What is claimed is:

1. A cut-off tool comprising:
    a housing;
    an arbor rotatably supported by the housing upon which a cutting disk is attachable for co-rotation therewith;
    a motor coupled to the arbor to provide torque thereto;
    a controller operable to selectively drive the motor in a first rotational direction and an opposite, second rotational direction for selectively rotating the arbor and the cutting disk in the first rotational direction or the second rotational direction, respectively;
    a first lighting element coupled to a first portion of the housing; and
    a second lighting element coupled to a second portion of the housing,
    wherein one of the first lighting element and the second lighting element is configured to be activated by the controller in response to the motor being driven in the first rotational direction, and wherein the other of the first lighting element and the second lighting element is configured to be activated by the controller in response to the motor being driven in the second rotational direction.

2. The cut-off tool of claim 1, further comprising a forward/reverse selector shuttle coupled to the housing, wherein the forward/reverse selector shuttle is movable between a first position and a second position corresponding to the first rotational direction and the second rotational direction, respectively.

3. The cut-off tool of claim 2, wherein the controller is operable to drive the motor in the first rotational direction or the second rotational direction in response to the forward/reverse selector shuttle being in the first position or the second position, respectively.

4. The cut-off tool of claim 3, further comprising a trigger electrically connected with the controller to provide an input to the controller, and wherein, based on the input, the controller is configured to selectively activate the motor and one of the first lighting element or the second lighting element.

5. The cut-off tool of claim 1, further comprising a cutting disk attachable to the arbor for co-rotation therewith, wherein the first lighting element is configured to illuminate a workpiece behind the cutting disk, and wherein the second lighting element is configured to illuminate the workpiece in front of the cutting disk.

6. The cut-off tool of claim 1, wherein the housing includes a motor housing portion and a handle portion extending therefrom, and wherein the first lighting element is positioned proximate an end of the handle portion that is opposite the motor housing portion, and the second lighting element is positioned on the motor housing portion.

7. The cut-off tool of claim 6, further comprising a cutting disk attachable to the arbor for co-rotation therewith, wherein the motor housing portion includes an outer surface extending between a first end and a second end of the motor housing portion, wherein the cutting disk is rotatably supported on the arbor adjacent the second end, and wherein the second lighting element is positioned on the outer surface proximate the second end.

8. The cut-off tool of claim 6, wherein the housing further includes a battery receiving portion positioned adjacent the end of the handle portion, and wherein the first lighting element is positioned on the battery receiving portion.

9. The cut-off tool of claim 8, wherein the battery receiving portion includes a surface facing toward the motor housing portion, and wherein the first lighting element is positioned on the surface.

10. The cut-off tool of claim 6, further comprising a cutting disk attachable to the arbor for co-rotation therewith, wherein the first lighting element is configured to illuminate a workpiece behind the cutting disk, and wherein the second lighting element is configured to illuminate the workpiece in front of the cutting disk.

11. A cut-off tool comprising:
    a housing including a motor housing portion and a handle portion extending therefrom;
    an arbor rotatably supported by the housing;
    a cutting disk attachable to the arbor for co-rotation therewith;
    a motor positioned within the motor housing portion, the motor coupled to the arbor to provide torque thereto;
    a first lighting element positioned proximate an end of the handle portion that is opposite the motor housing portion; and
    a second lighting element positioned on the motor housing portion,
    wherein the first lighting element is configured to illuminate a workpiece behind the cutting disk, and wherein the second lighting element is configured to illuminate the workpiece in front of the cutting disk, wherein the housing further includes a battery receiving portion positioned adjacent the end of the handle portion, and wherein the first lighting element is positioned on the battery receiving portion.

12. The cut-off tool of claim 11, wherein the battery receiving portion includes a surface facing toward the motor housing portion, and wherein the first lighting element is positioned on the surface.

13. The cut-off tool of claim 11, wherein the motor housing portion includes an outer surface extending between a first end and a second end of the motor housing portion, wherein the cutting disk is rotatably supported on the arbor adjacent the second end, and wherein the second lighting element is positioned on the outer surface proximate the second end.

14. The cut-off tool of claim 11, further comprising a controller operable to selectively drive the motor in a first rotational direction and an opposite, second rotational direction for selectively rotating the arbor and the cutting disk in the first rotational direction or the second rotational direction, respectively, and wherein one of the first lighting element and the second lighting element is configured to be activated by the controller in response to the motor being driven in the first rotational direction, and wherein the other of the first lighting element and the second lighting element is configured to be activated by the controller in response to the motor being driven in the second rotational direction.

15. The cut-off tool of claim 14, further comprising a forward/reverse selector shuttle coupled to the housing, wherein the forward/reverse selector shuttle is movable between a first position and a second position corresponding to the first rotational direction and the second rotational direction, respectively.

16. The cut-off tool of claim 15, wherein the controller is operable to drive the motor in the first rotational direction or the second rotational direction in response to the forward/reverse selector shuttle being in the first position or the second position, respectively.

17. The cut-off tool of claim 16, further comprising a trigger electrically connected with the controller to provide an input to the controller, and wherein, based on the input, the controller is configured to selectively activate the motor and one of the first lighting element or the second lighting element.

18. The cut-off tool of claim 11, wherein the handle extends along a longitudinal axis, and wherein each of the first lighting element and the second lighting element is oriented at an oblique angle relative to the longitudinal axis such that each of the first lighting element and the second lighting element is configured to project light away from the housing and toward a workpiece being cut.

19. The cut-off tool of claim 11, wherein the first lighting element is positioned to illuminate a workpiece to one side of the cutting disk, and wherein the second lighting element is positioned to illuminate a workpiece on an opposite side of the cutting disk.

* * * * *